(12) United States Patent
Wirth et al.

(10) Patent No.: US 10,981,675 B2
(45) Date of Patent: Apr. 20, 2021

(54) PROPELLER BALANCING USING INFLIGHT DATA

(71) Applicant: PRATT & WHITNEY CANADA CORP., Longueuil (CA)

(72) Inventors: Richard Brian Wirth, Stoney Creek (CA); Robert Winchcomb, St-Lambert (CA); Bruce Calvert, Burlington (CA); Robert Wigny, Bolton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/804,715

(22) Filed: Feb. 28, 2020

(65) Prior Publication Data

US 2020/0198806 A1 Jun. 25, 2020

Related U.S. Application Data

(63) Continuation-in-part of application No. 15/611,001, filed on Jun. 1, 2017, now Pat. No. 10,611,501, which
(Continued)

(51) Int. Cl.
*B64F 5/40* (2017.01)
*B64D 45/00* (2006.01)
(Continued)

(52) U.S. Cl.
CPC .............. *B64F 5/40* (2017.01); *B64C 11/008* (2013.01); *B64D 45/00* (2013.01); *B64F 5/60* (2017.01)

(58) Field of Classification Search
CPC ..... B64F 5/40; B64F 5/60; B64D 45/00; B64C 11/008
See application file for complete search history.

(56) References Cited

U.S. PATENT DOCUMENTS 2,362,842 A 11/1944 Mueller
3,490,556 A 1/1970 Bennett et al.
(Continued)

FOREIGN PATENT DOCUMENTS

CN 102689687 9/2012
EP 0407179 A1 1/1991
(Continued)

OTHER PUBLICATIONS

European Search Report dated Jun. 27, 2017 in connection with corresponding European application No. 17162601.

*Primary Examiner* — Rodney A Butler
(74) *Attorney, Agent, or Firm* — Norton Rose Fulbright Canada LLP

(57) ABSTRACT

The present disclosure provides methods and systems for propeller balancing of an aircraft comprising a propeller. Acceleration data is obtained from an acceleration sensor coupled to the aircraft. The acceleration data is filtered using a filter to obtain propeller-specific vibration data, the filter defining a range of acceptable frequencies associated with a frequency of rotation of the propeller. The propeller-specific vibration data is compared to trend data associated with the propeller. When the propeller-specific vibration data differs from the trend data beyond a predetermined threshold, an alert indicative of a balancing need for the propeller is issued.

20 Claims, 8 Drawing Sheets

Related U.S. Application Data is a continuation of application No. 15/078,394, filed on Mar. 23, 2016, now Pat. No. 9,694,915.

(51) Int. Cl.
*B64F 5/60* (2017.01)
*B64C 11/00* (2006.01)

(56) References Cited

U.S. PATENT DOCUMENTS

| | | | |
|---|---|---|---|
| 3,680,363 A | 8/1972 | Holz et al. | |
| 4,112,774 A * | 9/1978 | Chadwick | G01M 1/22 73/147 |
| 5,069,071 A | 12/1991 | McBrien et al. | |
| 5,450,760 A * | 9/1995 | Lew | G01F 1/106 73/861.02 |
| 6,322,324 B1 | 11/2001 | Kennedy et al. | |
| 6,505,143 B1 * | 1/2003 | Lakshminarasimha | G05B 19/4065 702/183 |
| 7,957,851 B2 | 6/2011 | Braswell et al. | |
| 8,682,509 B2 | 3/2014 | Goodrich et al. | |
| 8,812,255 B2 | 8/2014 | Lynch et al. | |
| 8,914,205 B2 | 12/2014 | Chandran et al. | |
| 10,233,907 B2 * | 3/2019 | Asheim | F03D 17/00 |
| 2009/0263247 A1 | 10/2009 | Mollmann | |
| 2009/0301055 A1 | 12/2009 | Kallappa | |
| 2009/0306829 A1 * | 12/2009 | Hildebrand | B64C 11/008 700/279 |
| 2009/0306839 A1 * | 12/2009 | Youngquist | G01K 15/00 701/14 |
| 2011/0189017 A1 * | 8/2011 | Saucray | B64C 11/50 416/144 |
| 2011/0208361 A1 | 8/2011 | Hildebrand et al. | |
| 2013/0000314 A1 | 1/2013 | McCaffrey | |
| 2014/0090472 A1 * | 4/2014 | Lysen | F03D 7/0296 73/587 |
| 2014/0145025 A1 | 5/2014 | Fang et al. | |
| 2014/0150550 A1 | 6/2014 | Borwankar et al. | |
| 2016/0032725 A1 | 2/2016 | Heidari et al. | |
| 2017/0335828 A1 * | 11/2017 | Muller | F03D 17/00 |

FOREIGN PATENT DOCUMENTS

| | | |
|---|---|---|
| EP | 2594912 | 5/2013 |
| WO | 2012021202 | 2/2012 |

* cited by examiner

PROPELLER BALANCING USING INFLIGHT DATA

CROSS-REFERENCE TO RELATED APPLICATIONS

This application is a continuation-in-part of U.S. patent application Ser. No. 15/611,001, filed on Jun. 1, 2017, which is a continuation of U.S. patent application Ser. No. 15/078,394 filed on Mar. 23, 2016, the contents of which are hereby incorporated in their entirety by reference.

TECHNICAL FIELD

The disclosure relates generally to a system and method for propeller balancing on propeller-powered aircraft.

BACKGROUND OF THE ART

Propeller powered aircraft, small and large, require propeller balancing at some point in time. Some require balancing more often than others.

Many systems require the aircraft to be on the ground to perform engine runs in order to collect the data needed for propeller balancing. This is not an effective solution as the ground data is not truly representative of inflight conditions. Other systems will collect data inflight and provide it to a ground station post-flight for analysis. However, such systems are programmed to gather data at specific points in time, which again does not consider specific operational conditions of the flight.

Therefore, there is room for improvement.

SUMMARY

In one aspect, there is provided a method for propeller balancing of an aircraft. The method comprises receiving propeller vibration data comprising speed, phase, and magnitude of vibration, the propeller vibration data having been collected in-flight; receiving aircraft data collected in-flight concurrently with the propeller vibration data; selecting at least a portion of the propeller vibration data by comparing the aircraft data with at least one customizable flight criterion and identifying the portion of the vibration data acquired at a time when the aircraft data meets the at least one customizable flight criterion; analyzing the selected portion of the propeller vibration data to assess a vibration level of the propeller; and signaling a balancing need when the vibration level reaches a threshold.

In another aspect, there is provided a system for aircraft propeller balancing. The system comprises a processing unit and a memory, communicatively coupled to the processing unit and comprising computer-readable program instructions. The instructions are executable by the processing unit for receiving propeller vibration data comprising speed, phase, and magnitude of vibration, the propeller vibration data having been collected in-flight; receiving aircraft data collected in-flight concurrently with the propeller vibration data; selecting at least a portion of the propeller vibration data by comparing the aircraft data with at least one customizable flight criterion and identifying the portion of the vibration data acquired at a time when the aircraft data meets the at least one customizable flight criterion; analyzing the selected portion of the propeller vibration data to assess a vibration level of the propeller; and signaling a balancing need when the vibration level reaches a threshold.

In a further aspect, there is provided a non-transitory computer readable medium having stored thereon computer-readable program instructions executable by a processor for receiving propeller vibration data comprising speed, phase, and magnitude of vibration, the propeller vibration data having been collected in-flight; receiving aircraft data collected in-flight concurrently with the propeller vibration data; selecting at least a portion of the propeller vibration data by comparing the aircraft data with at least one customizable flight criterion and identifying the portion of the vibration data acquired at a time when the aircraft data meets the at least one customizable flight criterion; analyzing the selected portion of the propeller vibration data to assess a vibration level of the propeller; and signaling a balancing need when the vibration level reaches a threshold.

In accordance with another broad aspect, there is provided a method for propeller balancing of an aircraft comprising a propeller. Acceleration data is obtained from an acceleration sensor coupled to the aircraft. The acceleration data is filtered using a filter to obtain propeller-specific vibration data, the filter defining a range of acceptable frequencies associated with a frequency of rotation of the propeller. The propeller-specific vibration data is compared to trend data associated with the propeller. When the propeller-specific vibration data differs from the trend data beyond a predetermined threshold, an alert indicative of a balancing need for the propeller is issued.

In accordance with a further broad aspect, there is provided a system for propeller balancing of an aircraft comprising a propeller. The system comprises a processing unit, and a non-transitory computer-readable medium having stored thereon instructions. The instructions are executable by the processing unit for: obtaining acceleration data from an acceleration sensor coupled to the aircraft; filtering the acceleration data using a filter to obtain propeller-specific vibration data, the filter defining a range of acceptable frequencies associated with a frequency of rotation of the propeller; comparing the propeller-specific vibration data to trend data associated with the propeller; and when the propeller-specific vibration data differs from the trend data beyond a predetermined threshold, issuing an alert indicative of a balancing need for the propeller Features of the systems, devices, and methods described herein may be used in various combinations, in accordance with the embodiments described herein. In particular, any of the above features may be used alone, together in any suitable combination, and/or in a variety of arrangements, as appropriate.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
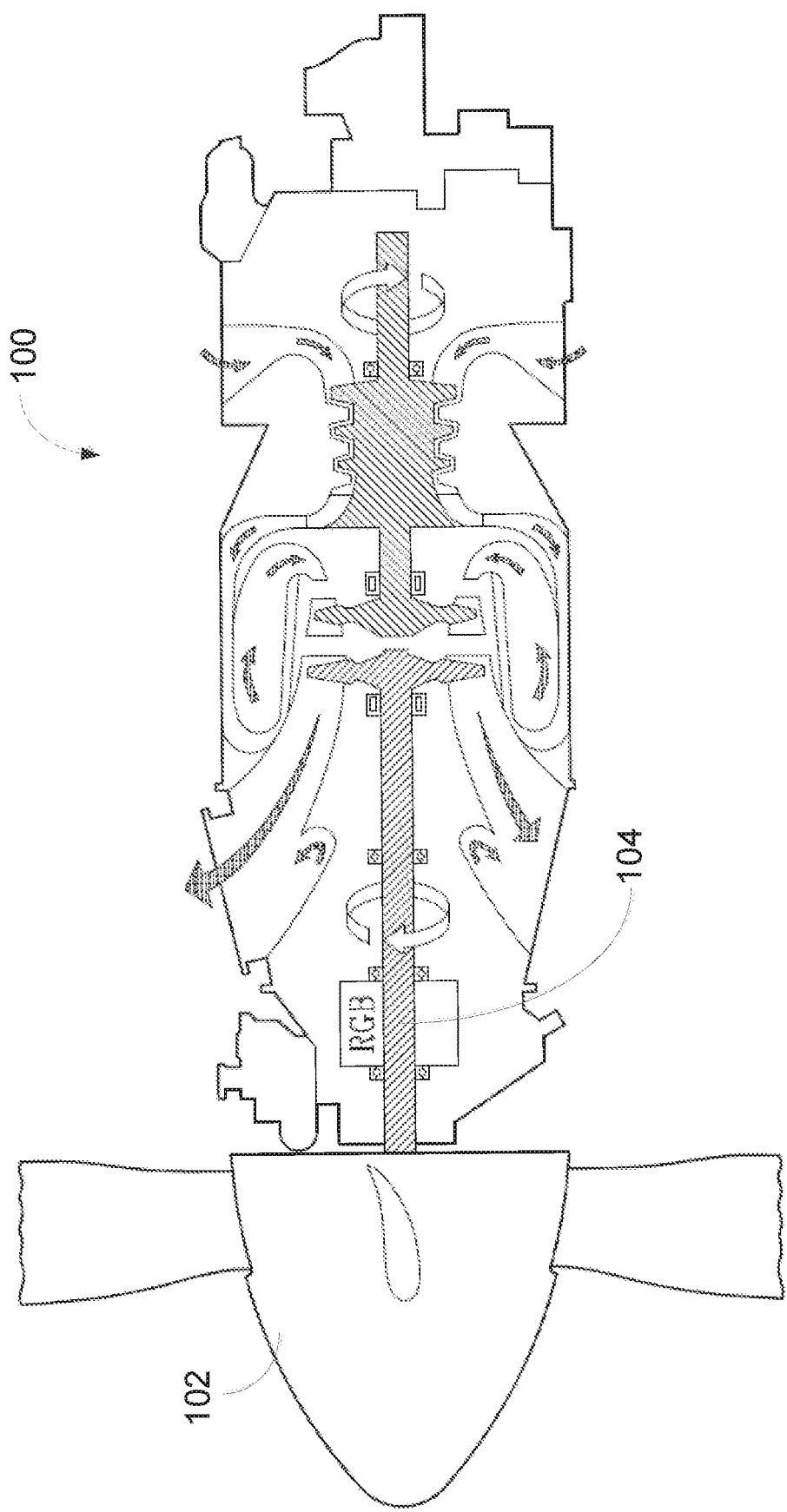
FIG. 1 is a cross-sectional view of a turboprop engine, in accordance with one embodiment.

FIG. 1 illustrates an example engine 100 comprising a propeller 102. The propeller 102 converts rotary motion from the shaft 104 to provide propulsive force to an aircraft. The engine 100 of FIG. 1 is a turboprop but it could also be any other type of engine comprising a propeller 102, such as a piston engine, a turboshaft engine, and the like.

Figure 2:
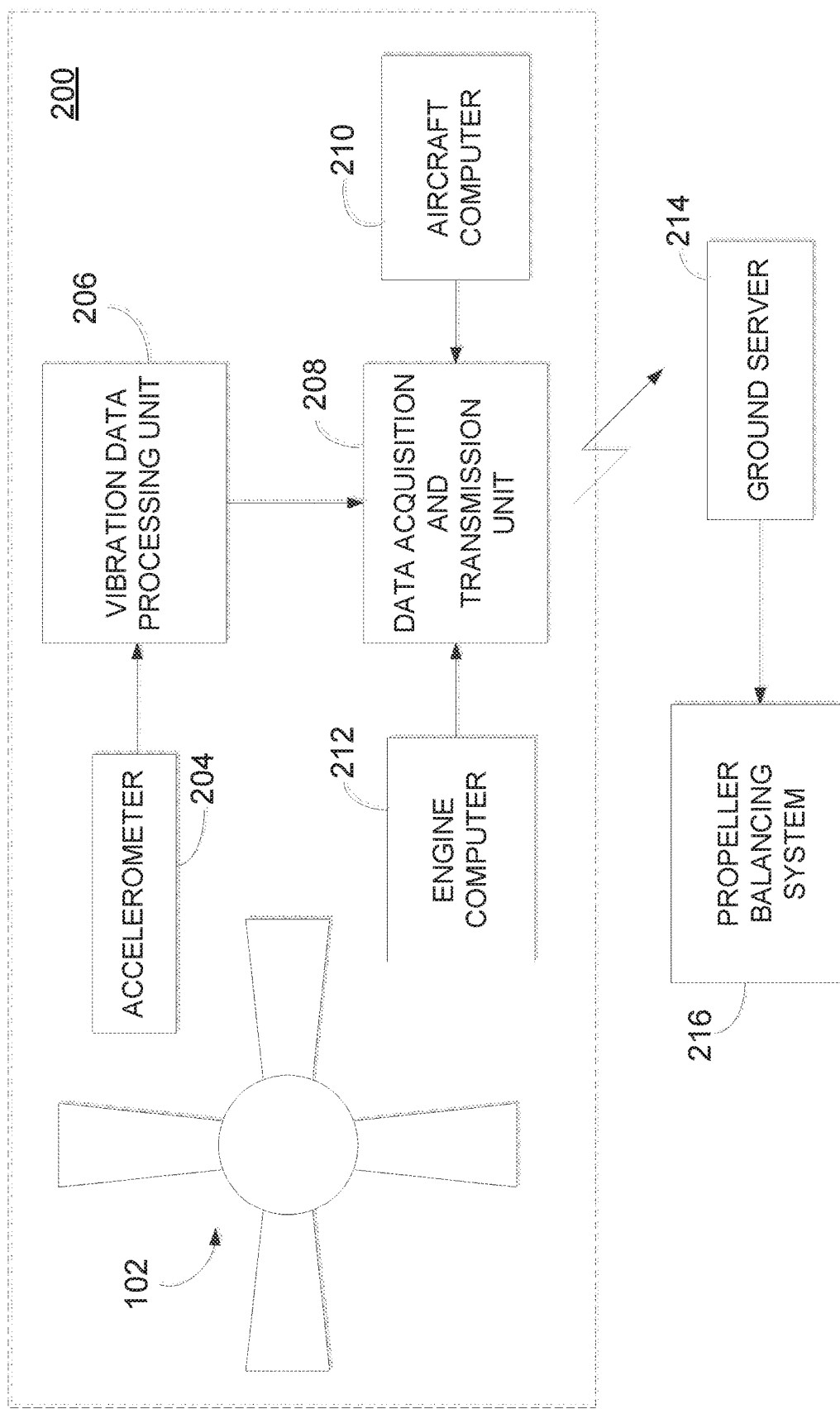
FIG. 2 is a schematic diagram of an aircraft system and corresponding ground equipment for performing propeller balancing.

FIG. 2 illustrates an example aircraft 200, which may be any type of propeller-driven aircraft 200. At least one accelerometer 204 is provided per engine 100 of the aircraft 200, for collecting measurement data from the propeller 102. The measurement data corresponds to the acceleration of the front of the engine 100 in a direction normal to the shaft 104 of the propeller 102. When the propeller 102 is out of balance, as the center of mass rotates around the axis of rotation, the resulting centripetal force tries to pull the propeller 102 towards the center of mass. This rotating imbalance force acts on the mass of the engine 100 and propeller 102 and accelerates it. This acceleration is measured by the accelerometer 204.

The accelerometer 204 may be mounted directly on the engine 100, proximate to the propeller 102, in order to measure the acceleration of the propeller 102. The installation may be permanent or temporary. A permanent mount may be performed during manufacture of the engine 100. When the aircraft is assembled, the accelerometer 204 may be connected to an existing aircraft harness (not shown). One or more additional cables, adapters, connectors, and/or harnesses may be added in order to connect the accelerometer 204 to the existing aircraft harness. A temporary mount may be performed after manufacture of the engine 100 and/or after aircraft assembly, such as during aircraft maintenance.

The measurement data collected by the accelerometer 204 may be transmitted to a vibration data processing unit 206, via the existing aircraft harness and/or additional cables, adapters, connectors, and/or harnesses. Alternatively, transmission of the data collected by the accelerometer 204 is performed wirelessly. Therefore, the accelerometer 204 may be configured for providing the measurement data to the vibration data processing unit 206 via any suitable wired or wireless communication path, including RS-232, USB, USB 2.0, USB 3.0, USB-C, SATA, e-SATA, Thunderbolt™, Ethernet, Wi-Fi, Zigbee™, Bluetooth™, and the like.

The vibration data processing unit 206 is configured to determine, from the measurement data, vibration data for the engine 100 and/or the propeller 102. The vibration data comprises propeller speed as well as phase angle and magnitude of engine vibration. Speed may be denoted as a Rotation Per Minute (RPM) of the propeller 102. The accelerometer 204 may act as a tachometer to measure the propeller 102 RPM. One or more additional sensors may also be provided for this purpose. Magnitude may be denoted as a peak velocity in units of Inches Per Section (IPS). The phase angle is found by detecting when one particular propeller blade passes the accelerometer 204, and corresponds to the relationship between the waveform of the vibration magnitude signal to the angular position of the propeller 102. The vibration data processing unit 206 may be configured to digitize the measurement data if received in analog form, and determine the vibration data from the digitized data.

The vibration data determined by the vibration data processing unit 206 is transmitted to a data acquisition and transmission unit 208. The data acquisition and transmission unit 208 may take various forms, such as a Flight-data Acquisition, Storage, and Transmission (FAST™) box, as manufactured by Pratt & Whitney Canada, or any other computer-controlled unit that receives data from various aircraft systems and sensors, and transmits the received data off-aircraft to a ground server 214. For example, the data acquisition and transmission unit 208 may comprise one or more antenna, a processor, and a memory. The one or more antenna enable establishment of a wireless connection with the ground server 214. The processor may be coupled to a data bus of the aircraft 200 for receiving the vibration data and any other data from the aircraft systems and sensors. In some embodiments, the vibration data is transmitted from the vibration data processing unit 206 to the data acquisition and transmission unit 208 using the Aeronautical Radio Inc. (ARINC) 429 data transfer standard for aircraft avionics. Other data standards may also be used, such as ARINC 615, ARINC 629, and MIL-STD-1553.

In some embodiments, the data acquisition and transmission unit 208 is also configured to convert received data into digital form. As illustrated, unit 208 also receives data from an engine computer 212 and/or an aircraft computer 210. This data will be collectively referred to as aircraft data, and denote engine and/or aircraft performance parameters. The aircraft computer 210 may be an aircraft management controller (AMC), a flight management system (FMS), an aircraft digital computer system, or any other device used for computing inside an aircraft 200. The engine computer 212 may be any type of computing unit of an engine 100, such as an engine control unit (ECU), an engine electronic controller (EEC), an engine electronic control system, and a Full Authority Digital Engine Controller (FADEC). Data transmitted from the engine computer 212 and/or the aircraft computer 210 to the data acquisition and transmission unit 208 may be provided over a dedicated communication bus or any other existing communication system of the aircraft 200. Example data provided by the aircraft computer 210 comprises airspeed, altitude, stability, and position of the aircraft 200 at any point in time during a flight. Example data provided by the engine computer 212 comprises torque, speed, rating, torque stability, propeller speed stability, and compressor speed stability of the engine 100 at any point in time during engine operation.

In some embodiments, the vibration data processing unit 206 is integrated with the data acquisition and transmission unit 208. The accelerometer 204 may thus be connected directly to the data acquisition and transmission unit 208 for providing measurement data thereto, and the data acquisition and transmission unit 208 may be configured to determine the vibration data from the measurement data. The data acquisition and transmission unit 208 is configured to transmit both the vibration data and the aircraft data to the ground server 214 via a wireless communication link.

Once received by the ground server 214, the aircraft data and the vibration data are provided to a propeller balancing system 216 for further processing. The propeller balancing system 216 may be provided directly on the ground server 214 or separately therefrom. In some embodiments, the propeller balancing system 216 may be implemented in hardware, using analog and/or digital circuit components. For example, the propeller balancing system 216 may be provided as an application-specific integrated circuit (ASIC) or a field programmable gate array (FPGA). In some embodiments, the propeller balancing system 216 is provided as a non-transitory computer readable medium having stored thereon program code executable by a processor for carrying out the instructions of the program code.

Figure 3:
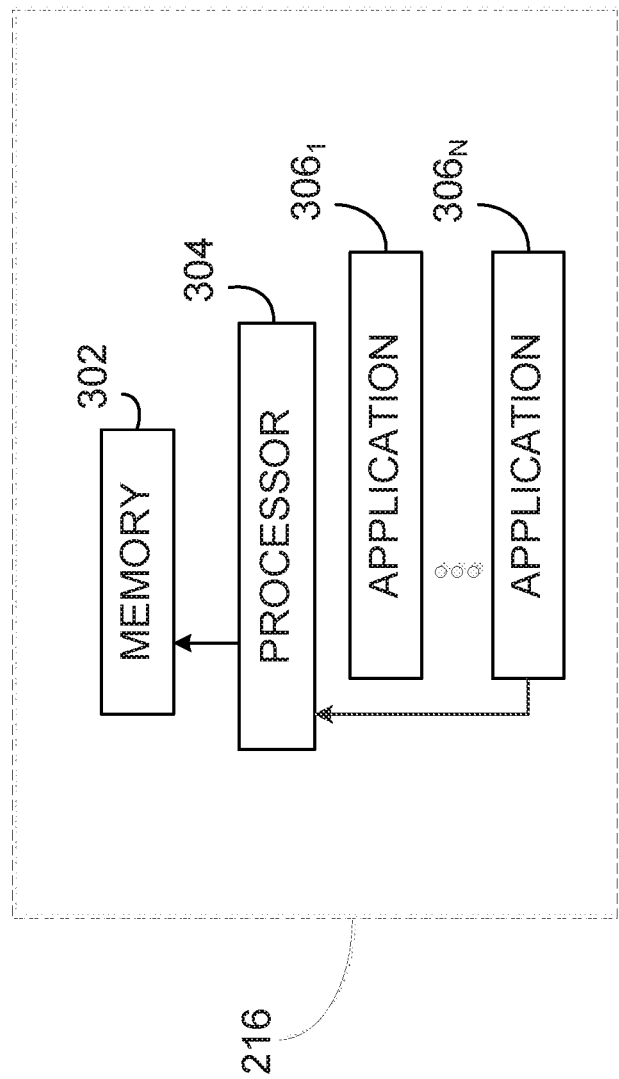
FIG. 3 is a block diagram of an example embodiment of a propeller balancing system.
Figure 4:
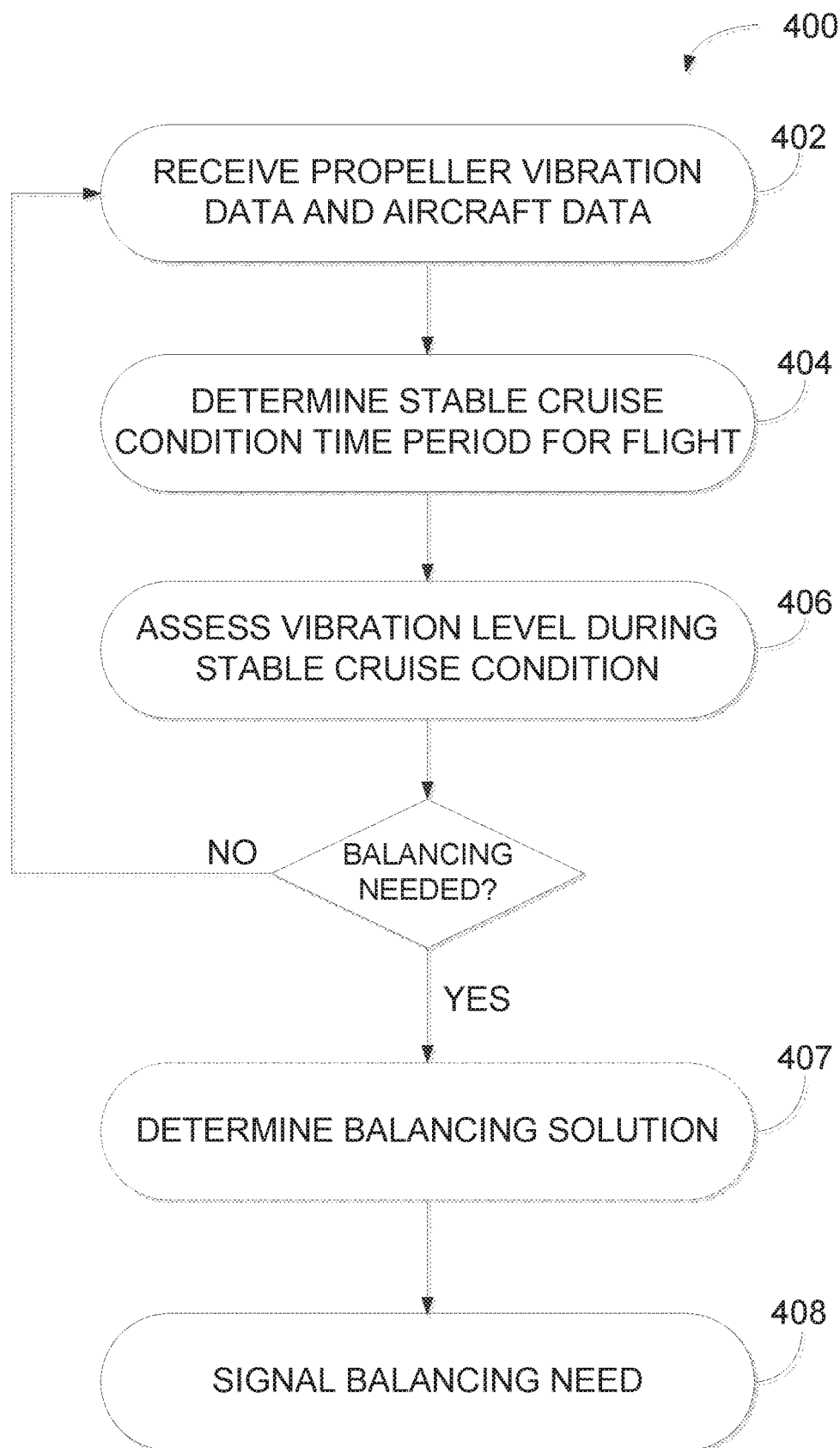
FIG. 4 is a flowchart of a method for performing propeller balancing, in accordance with one embodiment.

In other embodiments, the propeller balancing system 216 is implemented using a combination of hardware and software components, as one or more applications $306_1 \ldots _N$ stored in a memory 302 and running on a processor 304, as illustrated in FIG. 3. The applications $306_1 \ldots _N$ are illustrated as separate entities but may be combined or separated in a variety of ways. The memory 302 accessible by the processor 304 may receive and store the vibration data and the aircraft data. The memory 302 may be a main memory, such as a high speed Random Access Memory (RAM), or an auxiliary storage unit, such as a hard disk, a floppy disk, or a magnetic tape drive. The memory 302 may be any other type of memory, such as a Read-Only Memory (ROM), or optical storage media such as a videodisc and a compact disc. The processor 304 may access the memory 302 to retrieve the data. The processor 304 may be any device that can perform operations on data. Examples are a central processing unit (CPU), a front-end processor, a microprocessor, and a network processor. The applications $306_1 \ldots _N$ are coupled to the processor 304 and configured to perform a method 400 for propeller balancing, which will be described with reference to FIG. 4.

At step 402 of the method 400, the propeller vibration data and the aircraft data are received by the propeller balancing system 216. The data may be received sequentially or concurrently. When received sequentially, the order of reception is irrelevant.

At step 404, the propeller balancing system 216 determines from the aircraft data a time period during which the aircraft operated in a stable cruise condition. Stable cruise condition corresponds to an operating condition of the aircraft during which certain flight criteria are attained. The flight criteria may correspond to engine parameters and/or aircraft parameters. Example aircraft parameters are minimum altitude, stability duration, minimum calibrated airspeed, altitude stability, and calibrated airspeed stability. Example engine parameters are propeller rotational speed, engine torque, engine rating, engine torque stability, engine propeller speed (Np) stability, and engine compressor speed (Nh) stability.

In some embodiments, stable cruise condition is operator-specific, that is to say that the flight criteria which determine whether an aircraft is operating in stable cruise condition are set by the aircraft operator. The operator may select which flight criteria are to be considered, and/or may set values for the flight criteria considered. TABLE 1 is an example of a set of flight criteria with operator-specific parameters for a flight operator X.

TABLE 1

| FLIGHT CRITERIA | VALUE |
| --- | --- |
| MINIMUM ALTITUDE | >12,000 ft |
| PROPELLER SPEED | 880-930 rpm |
| STABILITY DURATION | 120 seconds |
| MINIMUM CALIBRATED AIRSPEED | 160 knots |
| ENGINE TORQUE | >32% |

TABLE 1-continued

| FLIGHT CRITERIA | VALUE |
| --- | --- |
| ENGINE RATING | CLA = 55 + 5 |
| ALTITUDE STABILITY | <+100 feet |
| CALIBRATED AIRSPEED STABILITY | <+5 knots |
| ENGINE TORQUE STABILITY | <+1% |
| PROPELLER SPEED STABILITY | <+0.5% |
| COMPRESSOR SPEED STABILITY | <+0.2% |

In this example, flight operator X has selected eleven (11) flight criteria used to determine stable cruise condition of an aircraft during a flight, and has set a value for each one of the eleven (11) flight criteria. These values may be set for aircraft A or fleet A comprising multiple aircraft A, which is for example an ATR 42 aircraft. Operator X may select different values for aircraft B or fleet B comprising multiple aircraft B, which is for example an ATR 72 aircraft. Operator X may also select more or less flight criteria, with the same or different values, for aircraft C or fleet C comprising multiple aircraft C, which is for example a Q400 aircraft. Therefore, operator X may operate fleets of aircraft with aircraft A, B, and C, and each aircraft may have its own set of flight criteria and associated values for establishing stable cruise condition.

Operator X may also set the parameters for stable cruise condition as a function of the specific mission of each aircraft. A "mission" should be understood as a flight to perform a specific task. The mission may be defined by various parameters, such as duration, destination, cargo, and any flying parameters to be used during the mission, such as propeller speed or maximum altitude. For example, operator X may have aircraft A and B fly at a propeller speed of 1050 RPM while aircraft C flies at a propeller speed of 975 RPM. The value associated for the flight criteria "propeller speed" may therefore differ between aircraft A and B and aircraft C. In some embodiments, operator X may define a unique set of flight criteria and associated values for each flight of an aircraft as a function of the specific flight parameters of a given flight, such as propeller speeds, cruising altitudes, etc. Therefore, aircraft specific and/or mission specific flight criteria and/or associated values may be used to determine stable cruise condition for any given flight. More or less than the specific flight criteria of Table 1 may be used.

Figure 5:
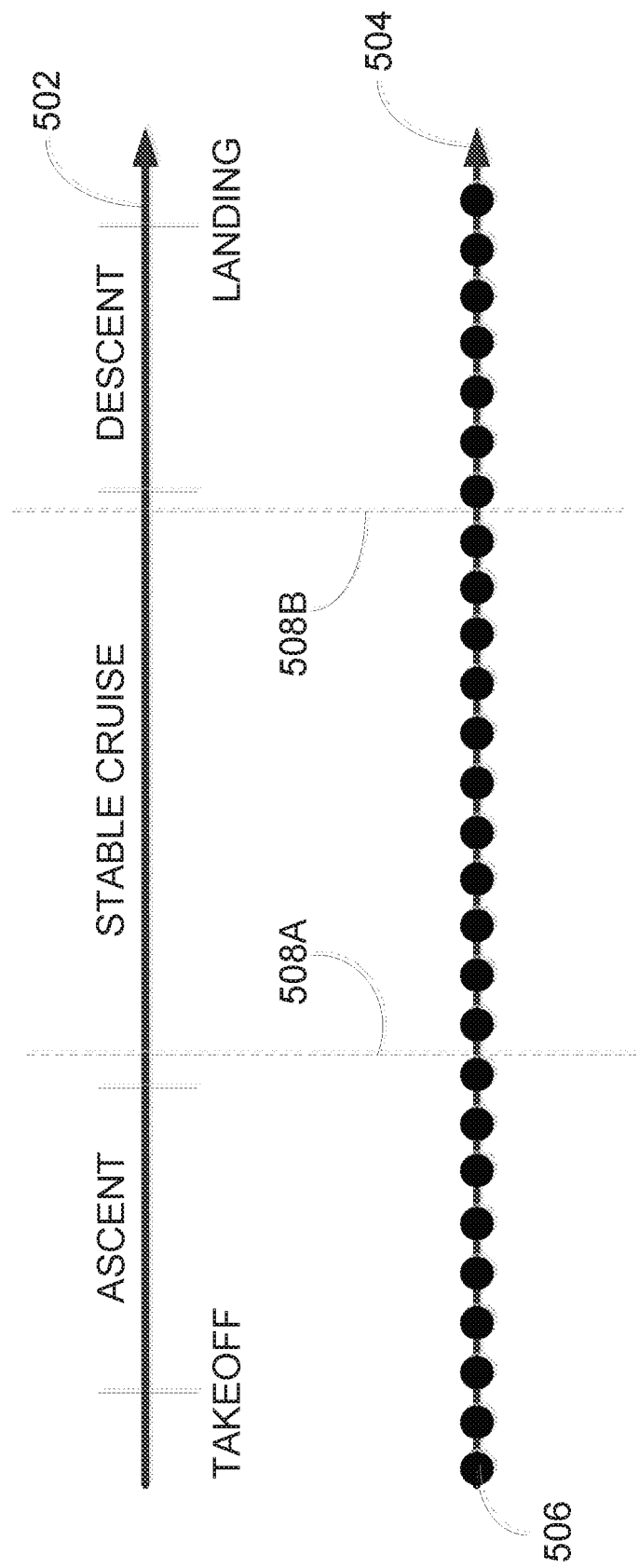
FIG. 5 illustrates an example of various aircraft operating conditions during a flight and corresponding data points acquired for vibration data.

FIG. 5 illustrates an example timeline 502 showing the different operating conditions throughout a flight for an aircraft 200. In this example, stable cruise condition occurs after takeoff and ascent and before descent and landing. In certain circumstances, there may be more than one instance of stable cruise condition, interspaced by ascent, descent, and/or one or more other condition, such as turning or unsteady. For example, when the aircraft 200 experiences turbulence, this may cause it to exit stable cruise condition. Once the aircraft 200 stabilizes, it may re-enter stable cruise condition.

As per step 406, a vibration level of the propeller 102 is assessed using vibration data captured while the aircraft 200 operates in stable cruise condition. Referring again to FIG. 5, an example timeline 504 illustrates the capture of data points 506 corresponding to the measurement data collected by the accelerometer 204 throughout the flight. The data points 506 may be captured at any predefined interval, such as 10 seconds, 15 seconds, 30 seconds, 1 minute, and the like. In order to use data points 506 that correspond to stable cruise condition, only the data points obtained during the period defined by cutoff lines 508A and 508B are used. From these data points, a vibration level of the propeller 102 is calculated using the propeller 102 rotational speed, the vibration phase, and the vibration magnitude of the aircraft 200. Multiple vibration levels may be used, as illustrated in the example of TABLE 2.

TABLE 2

| VIBRATION LEVEL | IPS | DESCRIPTION |
| --- | --- | --- |
| 1 | ≥1.0 | VERY ROUGH |
| 2 | <1.0 | ROUGH |
| 3 | <0.5 | SLIGHTLY ROUGH |
| 4 | <0.25 | FAIR |
| 5 | <0.15 | GOOD |
| 6 | <0.07 | VERY GOOD |
| 7 | <0.04 | EXCELLENT |

In this example, the vibration level is expressed in units of Inches Per Second (IPS). The threshold for balancing the propeller may be set to any one of the vibration levels, such as 3, 4, or 5. The threshold may be determined by an operator of the aircraft 200, or it may be set according to regional and/or other types of aircraft regulations. The threshold may be set as a function of the mission of the aircraft. For example, a cargo plane carrying only goods may have a lower threshold than an aircraft carrying passengers. Similarly, the threshold may be set as a function of various aircraft parameters, such as size of the aircraft, type of engine, etc. More or less threshold levels than those illustrated in TABLE 1 may be used.

When the vibration level of the propeller 102 reaches or exceeds the threshold, a balancing need is signaled by the propeller balancing system 216, as per step 408. In some embodiments, signaling a balancing need comprises sending a signal to an external system, so as to trigger an alert and/or alarm message. In some embodiments, signaling a balancing need comprises sending an electronic message to an operator of the aircraft or to a maintenance service. Other forms of signaling a balancing need may also be used.

In some embodiments, the method 400 also comprises a step of determining a balancing solution, as per step 407. Determining a balancing solution may comprise identifying a value and a location for at least one weight (or mass) to be added to the propeller 102. Other balancing solutions may include removing mass, radial drilling, milling, providing balancing rings, providing sliding blocks, and/or providing radial set screws. In such instances, step 408 of signaling a balancing need may also comprise providing the balance solution.

Figure 6:
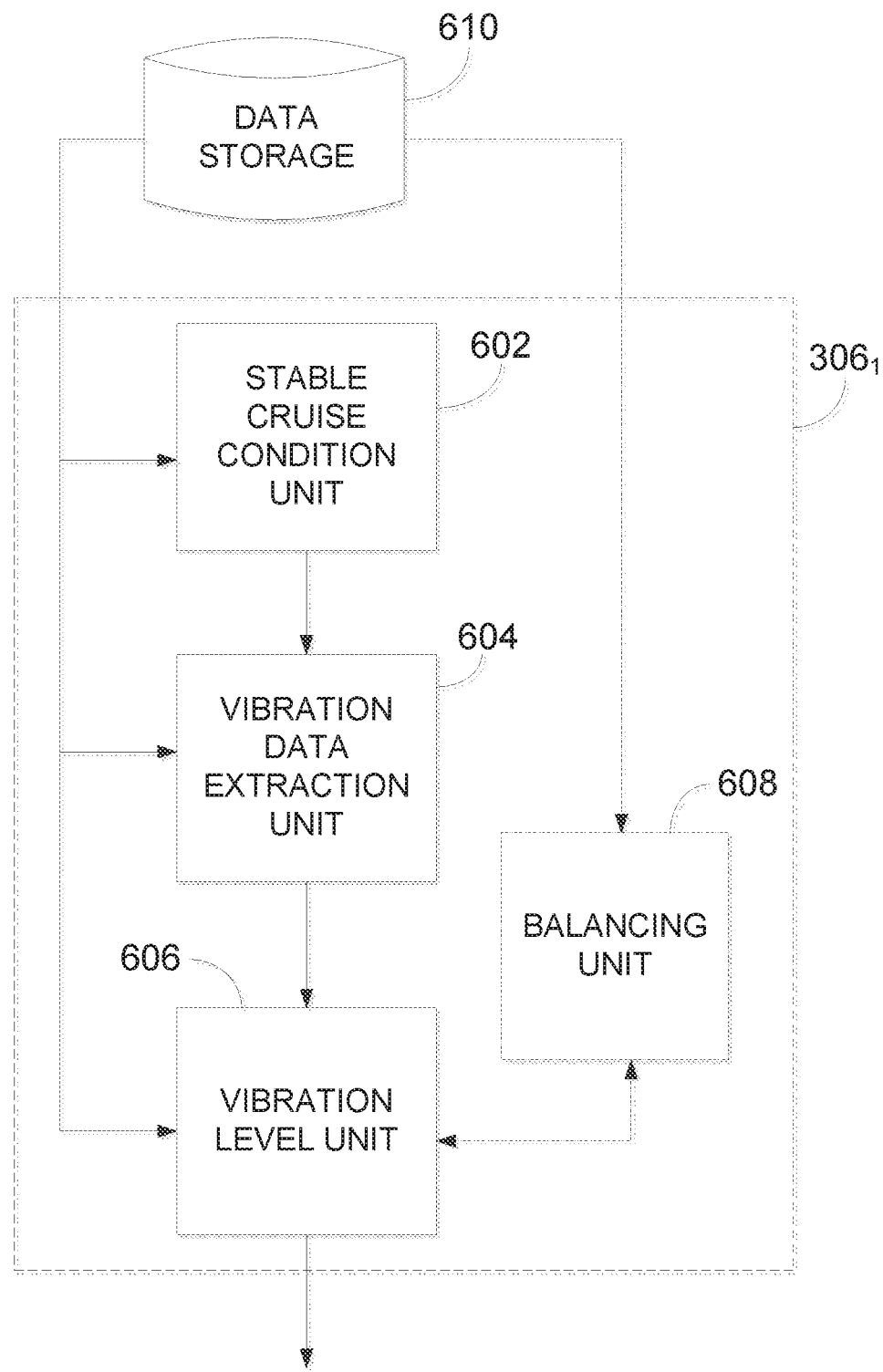
FIG. 6 is a block diagram of an example application running on the propeller balancing system, for performing the method of propeller balancing.

Referring now to FIG. 6, there is illustrated an example application 306₁ for implementing the method 400 for propeller balancing. The application 306₁ illustratively comprises a stable cruise condition unit 602, a vibration data extraction unit 604, and a vibration level unit 606. Optionally, a balancing unit 608 may also be provided.

The stable cruise condition unit 602 may retrieve the aircraft data from a data storage 610, or it may receive it directly from the ground server 214 or the data acquisition and transmission unit 208. The data storage 610 may correspond to the memory 302 or it may be another storage device, local to the propeller balancing system 216 or remote therefrom. The stable cruise condition unit 602 is configured to perform step 404 of method 400, namely determine the stable cruise condition time period for the flight. The flight criteria and associated values for determining stable cruise condition may be retrieved from the data storage 610, memory 302, or any other storage device.

The vibration data extraction unit may retrieve the vibration data from the data storage 610, or it may receive it directly from the ground server 214 or the data acquisition and transmission unit 208. When the time period of the flight during which the aircraft was operating in stable cruise condition is identified by the stable cruise condition unit 602, this information is provided to the vibration data extraction unit 604 for selection of data points collected during the same time period. The selected data points may be stored in the data storage 610 for retrieval by the vibration level unit 606, or they may be provided directly to the vibration level unit 606 by the vibration data extraction unit 604.

The vibration level unit 606 is configured for assessing the vibration level of the propeller 102, as per step 406 of the method 400, and signaling a balancing need when the vibration level reaches a threshold, as per step 408. In some embodiments, the vibration level unit 606 may also be configured to trigger the balancing unit 608 to compute a balancing solution. The balancing unit 608 may retrieve vibration data, aircraft data, and/or any other parameters needed for computing the balancing solution from the data storage 610. The balancing solution may be stored in the data storage 610 and retrieved by the vibration level unit 606 for transmitting to an operator and/or maintenance service, or it may be provided to the vibration level unit 606 directly. Operator and/or aircraft and/or mission specific parameters may also be retrieved from the data storage 610 by the balancing unit 608 and used to compute a unique balancing solution.

In some embodiments, the vibration level unit 606 and/or the balancing unit 608 is configured to perform trending of vibration data received over multiple flights for a given aircraft. Vibration levels may be compared over time from the multiple flights in order to monitor a progression of the vibration levels. Significant and/or sudden changes in vibration level may be noted by the propeller balancing system 216 and signaled to an operator and/or maintenance service of the aircraft by the vibration level unit 606. Other trends may also be observed from the vibration data and/or aircraft data.

Figure 7:
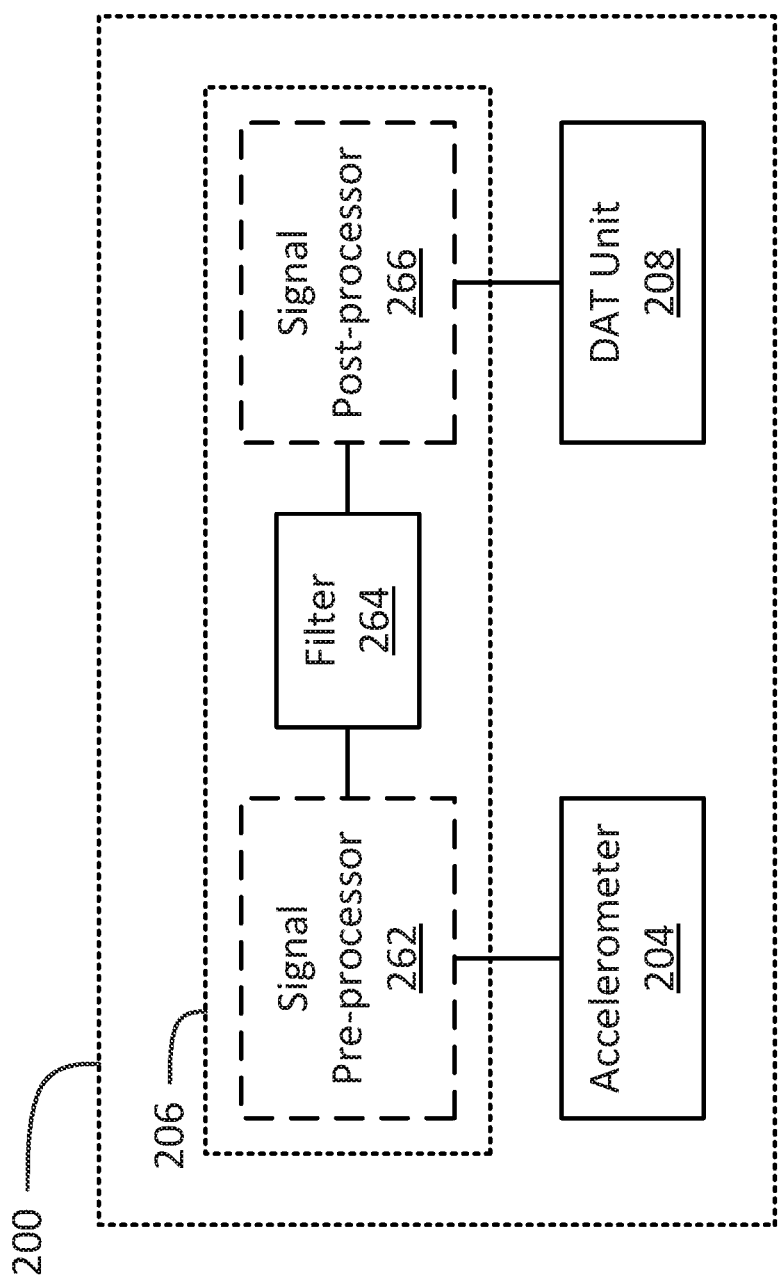
FIG. 7 is a block diagram of an example vibration data processing unit of an aircraft.

With reference to FIG. 7, and additional reference to FIG. 2, an embodiment of the vibration data processing unit 206, which forms part of the aircraft 200, is illustrated. The vibration data processing unit 206 is composed of a filter 264, and optionally includes a signal pre-processor 262 and/or a signal post-processor 266. The accelerometer 204, as described hereinabove, can be any suitable type of accelerometer, which can be coupled to any suitable part of the engine 100, or to any suitable part of the aircraft 200. In the embodiment of FIG. 7, it is considered that the accelerometer 204 is a singular accelerometer coupled to the engine 100 or the aircraft 200. For instance, the embodiment illustrated in FIG. 7 may be part of a propeller balancing or vibration monitoring system which is provided as a lower-cost solution, and thus includes only a single accelerometer 204.

The accelerometer 204 is configured for producing acceleration data indicative of accelerations which occur within the aircraft 200 and/or within the engine 100, for instance in the form of an acceleration data signal. The acceleration data signal is, for example, an analog signal which encodes information relating to the accelerations measured by the accelerometer in the form of pulses of different frequency. Other embodiments are also considered. The acceleration data produced by the accelerometer can concurrently provide information regarding the accelerations and/or vibrations experienced by various components within the aircraft 200 and/or the engine 100. For example, the acceleration data can be indicative of the vibrations experienced by the propeller 102, the propeller 104, and/or other elements of the engine 100 and/or the aircraft 200. Although the information indicative of these different vibrations are all encoded as part of the acceleration data produced by the accelerometer 204, the vibration data processing unit 206 illustrated in FIG. 7 is configured for isolating propeller-specific vibration data, as detailed hereinbelow.

The accelerometer 204 provides acceleration data to the vibration data processing unit 206. In embodiments in which the vibration data processing unit 206 includes the signal pre-processor 262, the acceleration data can be provided as part of a signal to the signal pre-processor 262. The signal pre-processor 262 can include one or more amplifiers, one or more noise filters, or the like, and can transform or otherwise perform signal processing on the acceleration data in any suitable fashion. The signal pre-processor 262 can then provide the acceleration data to the filter 264. In embodiments in which the signal pre-processor 262 is not included within the vibration data processing unit 206, the acceleration data can be provided from the accelerometer 204 to the filter 264.

The filter 264 is configured for filtering the acceleration data obtained from the signal pre-processor 262, or from the accelerometer 204, to obtain propeller-specific vibration data. The filter 264 defines a range of acceptable frequencies, also known as a passband, which are associated with a frequency of rotation of the propeller 102. By applying the filter 264 to the acceleration data, portions of the acceleration data not relevant to propeller vibration can be discarded, and the output of the filter 264 is a modified signal which is indicative of the vibrations experienced by the propeller 102.

For example, the propeller 102 is known to rotate at a particular frequency. In some cases, the vibration data processing unit 206 is preprogrammed with a predetermined frequency of rotation, or range of frequencies of rotation, for the propeller 102. In some other cases, the vibration data processing unit 206 can obtain data substantially in real-time, for instance from a sensor, which indicates the frequency of rotation of the propeller 102. The vibration data processing unit 206 can then alter the operation of the filter 246 to shift the range of acceptable frequencies in order to filter the acceleration data to obtain the propeller-specific vibration data. In some embodiments, the filter 246 is a band-pass filter, which defines a passband having a central frequency which is based on the frequency of rotation of the propeller. Other approaches for filtering the acceleration data signal provided by the accelerometer 204 to obtain propeller-specific vibration data is also considered.

Optionally, the filter 264 provides the propeller-specific vibration data, in the form of a signal, to the signal post-processor 266, which can perform various post-processing operations on the propeller-specific vibration data. In some embodiments, the signal post-processor 266 performs an analog-to-digital conversion, converting the analog signal output by the filter 264 to a digital signal, which is then transmitted to the DAT unit 208. For example, the analog-to-digital conversion can be performed by a remote-sensing node or other similar device, which can then be output by any suitable interface, for instance an ARINC 429 interface. In some other embodiments, the signal post-processor 266 performs a different type of conversion, for instance a conversion between a root-mean-squared signal to a DC (direct current) signal. Other types of signal conversions, for instance to facilitate the interpretation of the propeller-specific vibration data by the DAT unit 208, are considered. In some embodiments, the signal post-processor 266 can perform noise reduction, amplification, or other types of signal processing, as appropriate.

The propeller-specific vibration data is then provided to the DAT unit 208, whether from the filter 264 or from signal post-processor 266. The DAT unit 208 can then use the propeller-specific vibration data to perform trend analysis of vibration data received over multiple flights for a given aircraft. The propeller-specific vibration data obtained during a particular flight mission can be compared with trend data associated with the propeller 102, for instance to assess whether the propeller-specific vibration data indicates a change in the behavior of the propeller 102 vis-à-vis the trend data. In some embodiments, the trend data is preprogrammed into the DAT unit 208. In some other embodiments, the trend data is based on previously-acquired propeller-specific vibration data, for instance from one or more previous flight missions for the aircraft 200. The previously-acquired propeller-specific vibration data can be used, for instance, to augment preprogrammed trend data, or to build the trend data.

The trend analysis for the propeller-specific vibration data performed by the DAT unit 208 can include comparing the propeller-specific vibration data for a given flight mission against the trend data to determine whether the propeller-specific vibration data substantially aligns with the trend data, or whether the propeller-specific vibration data indicates a departure from the trend data. For example, the trend data can be associated with a predetermined range or other threshold, and when the propeller-specific vibration data is within the predetermined range, the DAT unit 208 can determine that the vibrations experienced by the propeller 102 are acceptable. Alternatively, when the propeller-specific vibration data is outside the range, the DAT unit 208 can determine that the propeller 102 is operating with unacceptable levels of vibration, and can issue an alert, for instance to the ground server 214, to indicate a balancing need for the propeller 102. The alert can indicate that a particular maintenance operation should be performed, for instance a propeller balancing operation, and/or provide relevant information for a maintenance crew assigned to the aircraft 200 and/or the engine 100. For instance, the alert can indicate a remaining flight time for the aircraft 200 and/or for the engine 100 before a maintenance operation is required. The DAT unit 208 can also identify instances where the propeller-specific vibration data quickly departs from the trend data as an indication of a mechanical failure or other event requiring a maintenance operation, and provide an indication thereof via the alert.

The trend analysis can also include comparing the propeller-specific vibration data against one or more predetermined threshold values for vibrations experienced by the propeller 102. For example, the DAT unit 208 can be preprogrammed with an expected vibration level for the propeller, for instance 0.13 inches/second (in/sec), or with an expected range of vibration levels for the propeller, for instance 0.13-0.23 in/sec. When the DAT unit 208 determines, based on the propeller-specific vibration data, that the vibrations experienced by the propeller 102 are beyond the expected vibration level or range, the DAT unit 208 can issue an alert for maintenance and/or propeller balancing.

In some embodiments, the DAT unit 208 is configured for updating the trend data based on the propeller-specific vibration data obtained during flight missions. The propeller-specific vibration data can be recorded or otherwise stored in a memory store, for instance within the DAT unit 208, and can then be used to update the trend data. The trend data can be updated substantially in real-time, or periodically, for instance following review of the propeller-specific vibration data by a maintenance crew assigned to the aircraft 200 and/or the engine 100, or by an operator of the aircraft 200 and/or the engine 100.

In some embodiments, the acceleration data obtained by the accelerometer 204 is subdivided into a plurality of acceleration data sets associated with different flight stages with the flight mission. For instance, different levels of vibration are experienced by the propeller 102 during take-off, ascent, cruise, descent, and landing, and the vibration processing unit 206 and/or the DAT unit 208 can be configured to subdivide the acceleration data and the propeller-specific vibration data into sets of data for different flight stages. Similarly, different sets of trend data can be maintained by the DAT unit 208 for different flight stages, and comparisons to the trend data sets can be performed on a per-flight-stage basis. Other variations are also considered. For instance, portions of the acceleration data can be discarded: acceleration data collected during ground operation of the aircraft 200 can be less indicative of the actual vibrations experienced by the propeller 102, and the DAT 208 can discard the associated propeller-specific vibration data.

Figure 8:
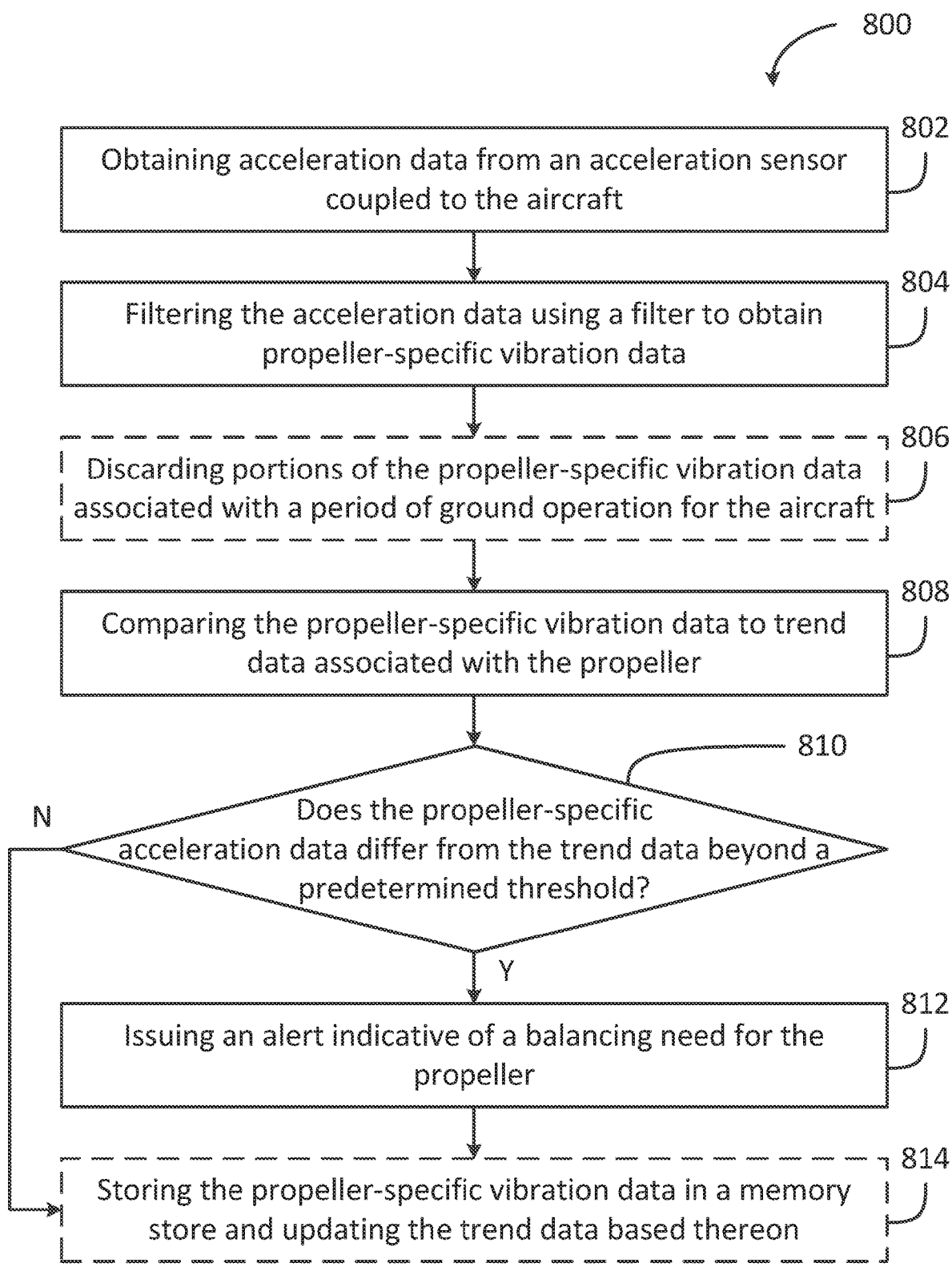
FIG. 8 is a flowchart of a method for performing propeller balancing of an aircraft having a propeller.

With reference to FIG. 8, there is illustrated a method 800 for performing propeller balancing of an aircraft having a propeller, for instance the aircraft 200 having the propeller 102. At step 802, acceleration data is obtained from an acceleration sensor, for instance the accelerometer 204. The accelerometer 204 can be coupled to the aircraft 200, for instance to the engine 100, or to another element of the aircraft 200. The acceleration data obtained from the accelerometer 204 can be in the form of an analog electrical signal, for instance, which encodes acceleration data therein.

At step 804, the acceleration data is filtered to obtain propeller-specific vibration data, for instance using the filter 264. The propeller-specific vibration data can be obtained by filtering the acceleration data through the filter 264, which has a passband associated with a frequency of rotation of the propeller 102.

Optionally, at step 806, portions of the propeller-specific vibration data which are associated with a period of ground operation for the aircraft 200 are discarded. For instance, information from other systems, including the aircraft computer 210 and/or the engine computer 212, can provide information to indicate periods of ground operation for the aircraft 200.

At step 808, the propeller-specific vibration data is compared to trend data associated with the propeller 102. At decision step 810, an evaluation is performed to assess whether the propeller-specific acceleration data differs from the trend data beyond a predetermined threshold. When the propeller-specific acceleration data does differ from the trend data beyond the predetermined threshold, the method 800 proceeds to step 812. When the propeller-specific acceleration data does not differ from the trend data beyond the predetermined threshold, the method 800 optionally proceeds to step 814, or returns to some previous step, for instance, step 802.

At step 812, an alert indicative of a balancing need for the propeller 102 is issued. For example, the alert is issued by the DAT unit 208 to the ground server 214, or to an operator or maintenance crew for the aircraft 200. In some embodiments, the alert is indicative of a maintenance operation to be performed, for instance for the propeller 102. In some other embodiments, the alert is indicative of a remaining flight time for the engine 100 and/or for the aircraft 200 before a maintenance operation is to be performed.

Optionally, at step 814, the propeller-specific vibration data is stored in a memory store and used to update the trend data. Step 814 is optionally performed after step 812, or when the propeller-specific acceleration data does not differ from the trend data beyond the predetermined threshold, as assessed at step 810. The updating of the trend data can include determining a new average, rolling average, or other trend information for the level of vibration experienced by the propeller 102. Other approaches are also considered. For example, a trend line slope for the level of vibration experienced by the propeller 102 can be updated based on the propeller-specific vibration data.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for propeller balancing of an aircraft comprising a propeller, the method comprising:
obtaining acceleration data from an acceleration sensor coupled to the aircraft;
filtering the acceleration data using a filter to obtain propeller-specific vibration data, the filter defining a range of acceptable frequencies associated with a frequency of rotation of the propeller;
comparing the propeller-specific vibration data to trend data, the trend data associated with the propeller and based on at least one previous light of the aircraft; and
when the propeller-specific vibration data differs from the trend data beyond a predetermined threshold, issuing an alert indicative of a balancing need for the propeller.

2. The method of claim 1, wherein the filter is a bandpass filter, and wherein the range of acceptable frequencies defines a passband having a central frequency based on the frequency of rotation of the propeller.

3. The method of claim 2, further comprising determining the central frequency by measuring the frequency of rotation of the propeller using a speed sensor associated with the propeller.

4. The method of claim 1, wherein obtaining the acceleration data from the acceleration sensor comprises obtaining the acceleration data from an accelerometer coupled to an engine associated with the propeller.

5. The method of claim 1, wherein issuing an alert comprises indicating that a maintenance operation is required.

6. The method of claim 1, wherein issuing an alert comprises indicating a remaining flight time for the aircraft until a maintenance operation is required.

7. The method of claim 1, further comprising:
storing the propeller-specific vibration data in a memory store; and
updating the trend data based on the propeller-specific vibration data.

8. The method of claim 7, wherein updating the trend data comprises updating a rolling average of a vibration level associated with the propeller.

9. The method of claim 1, further comprising discarding portions of the propeller-specific vibration data associated with a period of ground operation for the aircraft.

10. The method of claim 1, wherein obtaining acceleration data comprises obtaining acceleration data sets for a plurality of flight stages during a flight mission, wherein filtering the acceleration data to obtain the propeller-specific vibration data comprises filtering the acceleration data sets to obtain vibration data sets, and wherein comparing the propeller-specific vibration data to the trend data comprises comparing the vibration data sets to trend data sets of the trend data associated with the plurality of flight stages.

11. A system for propeller balancing of an aircraft comprising a propeller, the system comprising:
a processing unit; and
a non-transitory computer-readable medium having stored thereon instructions executable by the processing unit for:
obtaining acceleration data from an acceleration sensor coupled to the aircraft;
filtering the acceleration data using a filter to obtain propeller-specific vibration data, the filter defining a range of acceptable frequencies associated with a frequency of rotation of the propeller;
comparing the propeller-specific vibration data to trend data, the trend data associated with the propeller and based on at least one previous flight of the aircraft; and
when the propeller-specific vibration data differs from the trend data beyond a predetermined threshold, issuing an alert indicative of a balancing need for the propeller.

12. The system of claim 11, wherein filtering the acceleration data using the filter comprises using a bandpass filter, and wherein the range of acceptable frequencies defines a passband having a central frequency based on the frequency of rotation of the propeller.

13. The system of claim 12, wherein the instructions are further executable for determining the central frequency by measuring the frequency of rotation of the propeller using a speed sensor associated with the propeller.

14. The system of claim 11, wherein obtaining the acceleration data from the acceleration sensor comprises obtaining the acceleration data from an accelerometer coupled to an engine associated with the propeller.

15. The system of claim 11, wherein issuing an alert comprises indicating that a maintenance operation is required.

16. The system of claim 11, wherein issuing an alert comprises indicating a remaining flight time for the aircraft until a maintenance operation is required.

17. The system of claim 11, wherein the instructions are further executable for:
storing the propeller-specific vibration data in a memory store; and
updating the trend data based on the propeller-specific vibration data.

18. The system of claim 17, wherein updating the trend data comprises updating a rolling average of a vibration level associated with the propeller.

19. The system of claim 11, wherein the instructions are further executable for discarding portions of the propeller-specific vibration data associated with a period of ground operation for the aircraft.

20. The system of claim 11, wherein obtaining acceleration data comprises obtaining acceleration data sets for a plurality of flight stages during a flight mission, wherein filtering the acceleration data to obtain the propeller-specific vibration data comprises filtering the acceleration data sets to obtain vibration data sets, and wherein comparing the propeller-specific vibration data to the trend data comprises comparing the vibration data sets to trend data sets of the trend data associated with the plurality of flight stages.

* * * * *